US007204558B2

(12) United States Patent  (10) Patent No.: US 7,204,558 B2
Tanaka  (45) Date of Patent: Apr. 17, 2007

(54) AUTOMOBILE HEADREST

(75) Inventor: Yukio Tanaka, Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 11/425,002

(22) Filed: Jun. 19, 2006

(65) Prior Publication Data

US 2006/0284468 A1  Dec. 21, 2006

(30) Foreign Application Priority Data

Jun. 20, 2005  (JP) .............................. 2005-179511

(51) Int. Cl.
  *B60R 22/28* (2006.01)
(52) U.S. Cl. ..................................... 297/410
(58) Field of Classification Search ................ 297/410, 297/391
  See application file for complete search history.

(56) References Cited

U.S. PATENT DOCUMENTS

| 5,398,996 A | * | 3/1995 | Steiner ........................ 297/391 |
| 5,895,094 A | * | 4/1999 | Mori et al. .................. 297/410 |
| 6,062,645 A | * | 5/2000 | Russell ....................... 297/410 |
| 2005/0200185 A1 | * | 9/2005 | Yokoyama et al. ......... 297/410 |

FOREIGN PATENT DOCUMENTS

JP       04193109 A      7/1992

JP       2003259935      9/2003

* cited by examiner

Primary Examiner—Milton Nelson, Jr.
(74) Attorney, Agent, or Firm—McGlew & Tuttle, PC (57) ABSTRACT

Provided is an automobile headrest which can be prevented from being drawn out inadvertently or on purpose, and can be drawn out through a special operation if necessary. The automobile headrest includes a falloff preventing mechanism that can be composed of the same components as those of a height adjusting mechanism to be used. In the automobile headrest, a headrest stay is inserted in a headrest bush provided with a height adjusting mechanism. The headrest stay is provided with a height adjusting notch and a falloff preventing notch. The height adjusting mechanism can also serve as one headrest falloff preventing mechanism, so the height adjusting mechanism can lock and unlock the headrest. Another headrest stay is provided with a falloff preventing notch. Another headrest bush in which the other headrest stay is inserted is provided with the headrest falloff preventing mechanism including a lock member. The lock member is provided to abut on the other headrest stay inserted in the other headrest bush due to a resilient force of a spring so as to be capable of reciprocating. The lock member engages with the falloff preventing notch of the other headrest stay to prevent the headrest from falling off, and disengages from the falloff preventing notch when the lock member is operated against the resilient force of the spring. The falloff preventing notches arranged in both headrest stays are provided at different height positions.

7 Claims, 8 Drawing Sheets

AUTOMOBILE HEADREST

BACKGROUND OF THE INVENTION

1. Field of the Invention

The present invention relates to an automobile headrest, and more particularly, to an automobile headrest having a height adjusting mechanism and a falloff preventing mechanism for preventing the headrest from easily falling off from a seat back.

2. Description of the Related Art

It has been a common practice to mount a headrest to an automobile seat for the purpose of promoting safety and protecting a passenger in case of an accident such as a collision. To be adjustable to an arbitrary vertical position according to a physical constitution or preference of a passenger, the headrest is provided with a height adjusting mechanism. In general, two headrest stays are firmly fixed to the headrest and supported by being inserted respectively in two headrest bushes that are securely installed on a side of a seat back. In addition, one of the headrest bushes is provided with the height adjusting mechanism, and the other headrest bush is free.

In the case of a collision (including a rear-end collision), the automobile headrest prevents the head of a passenger in the seat from being tilted backwards too much due to an impact of the collision. At this moment, an impact force applied to the head of the passenger acts as a load pressing the headrest downwards. Therefore, the height adjusting mechanism of the automobile headrest allows the headrest to move upwards upon application of an extracting force thereto and to stop at an arbitrary height, and locks the headrest to prohibit it from moving downwards unless an unlocking operation is performed (e.g., see JP 04-193109 A).

To be more specific, the headrest stays of the headrest are vertically adjustably inserted and supported in the headrest bushes that are securely installed on the side of a seat back. Lock members that reciprocate owing to a resilient force are attached to the headrest bushes at positions corresponding to an upper end portion of the seat back and abut on the headrest stays, respectively. The headrest stays have a plurality of height adjusting notches arranged at a predetermined spacing. The headrest is held at a predetermined height through engagement of the lock members with the notches. In this state, the height adjusting notches are so shaped as to allow the headrest stays to move upwards in relation to the lock members but to prohibit the headrest stays from moving downwards.

Figure 7:
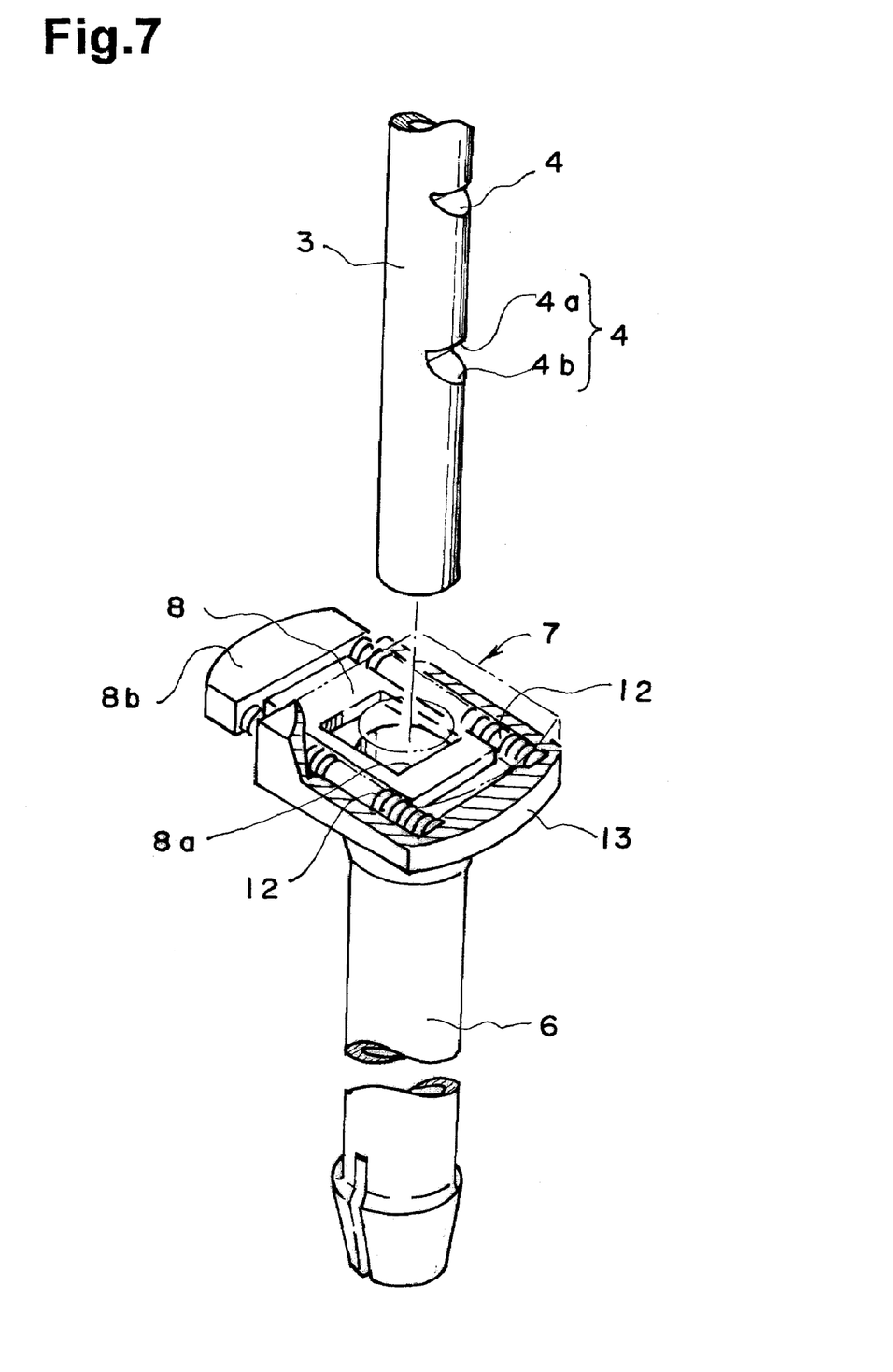
FIG. 7 is a partially broken exploded perspective view of a conventional height adjusting mechanism.
Figure 8:
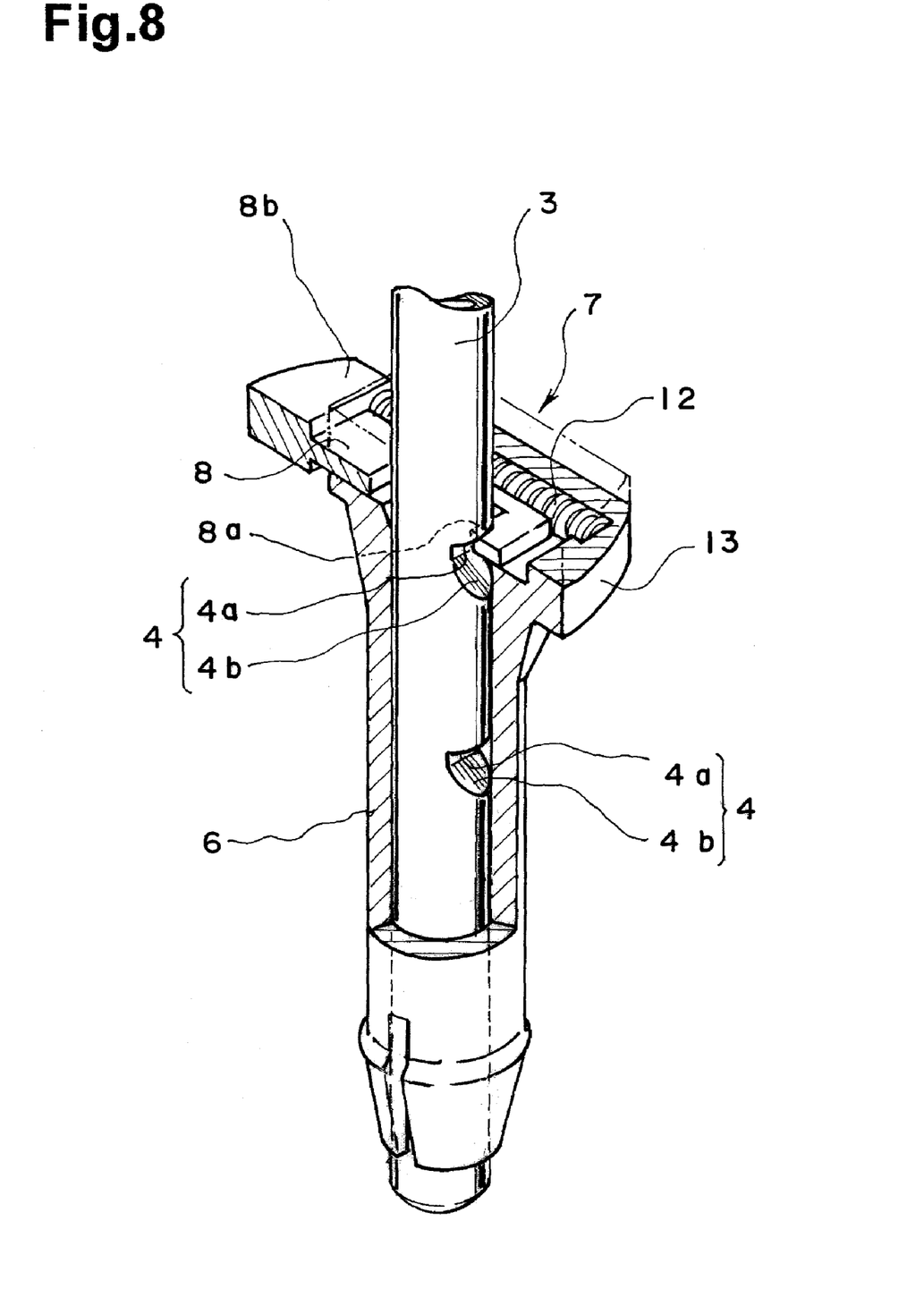
FIG. 8 is a sectional perspective view of a main part of the conventional height adjusting mechanism.

FIGS. 7 and 8 are each a partially broken exploded perspective view and a sectional perspective view of a main part of an example of the lock member. A headrest stay 3 of a headrest is inserted and supported in a tubular headrest bush 6, and a height adjusting mechanism 7 is attached to the headrest bush 6 at a position corresponding to an upper end portion of a seat back. In the height adjusting mechanism 7, a lock plate (lock member) 8 is attached to the headrest bush 6 so as to be free to reciprocate perpendicularly to the headrest stay 3, which penetrates the lock plate 8. A portion 8a of the lock plate 8 is pressed against the penetrating headrest stay 3 due to a resilient force of a spring 12. In practice, the lock plate 8 and the spring 12 are accommodated in a case 13, and only an operating portion 8b of the lock plate 8 protrudes outside. The headrest stay 3 has a plurality of height adjusting notches 4 arranged at a predetermined spacing. The lock plate 8 engages one of the notches 4 owing to the resilient force of a spring 12, to thereby lock the headrest stay 3. As shown in FIGS. 7 and 8, each of the height adjusting notches 4 is formed of a horizontal face 4a that extends toward the center of the headrest stay 3 and an inclined face 4b that extends downwards from the deepest portion of the horizontal face 4a. The inclined face 4b is gradually increased in diameter with distance from the deepest portion of the horizontal face 4a.

With this construction, when the headrest is pulled (drawn out) upwards, the portion 8a at which the lock plate 8 abuts on the headrest stay 3 is released from the notch 4 against the resilient force (spring force) of the spring 12 by the action of the inclined face 4b of the notch 4. As a result, the headrest stay 3 can be moved upwards and the height of the headrest can be adjusted. On the contrary, when the headrest is pressed downwards, the lock plate 8 remains engaged with the horizontal face 4a of the notch 4 without being released therefrom. Therefore, the headrest stay 3 is allowed to move downwards when the operating portion 8b of the lock plate 8 is pressed against the spring 12 and the lock plate 8 is released from the notch 4. Accordingly, the downward movement of the headrest can be adjusted.

As is apparent from the foregoing construction, the headrest equipped with the conventional height adjusting mechanism as described above can be easily drawn out from the seat. Therefore, the headrest may be drawn out inadvertently or on purpose, which raises a problem in that the safety of the passenger cannot be guaranteed in case of an accident such as a collision. Further, such the headrest cannot meet the requirements of the American National Standards FMVSS 202.

Thus, a headrest provided with a headrest falloff preventing mechanism is disclosed as a solution to the problem and as a product meeting the requirements of the American National Standards FMVSS 202 (e.g., see JP 2003-259935 A).

However, the conventional headrest falloff preventing mechanism can prevent the headrest from falling off, there is a problem in that the headrest cannot be drawn out from the seat. In practice, however, it is often necessary to draw the headrest out from the seat for the purposes of cleaning, maintenance, and the like. Further, in the case where an accident occurs when the seat is reclined backwards, the headrest tends to spring out from the seat due to a force acting on the headrest, but even in such the case, the falloff prevention needs to be reliably effected. According to the conventional example described above, for example, in such the case, speed with which the headrest stays come off is high, so the lock members pass over engagement recesses before engaging with the engagement recesses. In other words, there is another problem in that the falloff prevention does not work, so the headrest falls off.

SUMMARY OF THE INVENTION

In view of the above-mentioned problem, it is a primary object of the present invention to provide an automobile headrest which can be prevented from being drawn out inadvertently or on purpose, and can be drawn out through a special operation if necessary.

Further, it is advantageous in terms of cost to utilize the same components for a headrest height adjusting mechanism and a headrest falloff preventing mechanism (device). Therefore, it is a secondary object of the present invention to provide an automobile headrest allowing the same components of the headrest height adjusting mechanism to be used for the headrest falloff preventing mechanism (device).

To attain the above objects, an automobile headrest according to the present invention is characterized in that: the automobile headrest includes:

at least two headrest stays for supporting the headrest;

at least two headrest bushes which are fixed and provided on a seat back side, the at least two headrest stays being inserted in the at least two headrest bushes, respectively, to be supported; and a height adjusting mechanism provided to one of the at least two headrest bushes, and in that:

one of the at least two headrest stays to be inserted to one of the at least two headrest bushes provided with the height adjusting mechanism includes a falloff preventing notch in addition to height adjusting notches;

the height adjusting mechanism also serves as one headrest falloff preventing mechanism so that lock and unlock of the headrest can be performed by the height adjusting mechanism;

another of the at least two headrest stays includes another falloff preventing notch;

another of the at least two of the headrest bushes in which another of the at least two headrest stays is inserted, include the headrest falloff preventing mechanism, which is disengaged with the falloff preventing notch by the operation of the headrest falloff preventing mechanism; and the falloff preventing notches provided in both the at least two headrest stays are arranged at different height positions from one another so that unlocking operations of the height adjusting mechanism and the falloff preventing mechanism when the headrest is drawn out, must be performed separately.

With this construction, the headrest bush in which the headrest stay is inserted is provided with the height adjusting mechanism which also serves as the headrest falloff preventing mechanism, and the other headrest bush is provided with the headrest falloff preventing mechanism. Therefore, to draw the headrest out, it is required to perform the unlocking operation for both the height adjusting mechanism and the falloff preventing mechanism. Accordingly, the headrest is prevented from being drawn out from the seat back inadvertently or on purpose. Therefore, the headrest is always secured in position thereby ensuring passenger safety.

Further, when it is required to draw the headrest out from the seat for the purposes of cleaning, maintenance, and the like, the headrest can be drawn out through the unlocking operation performed for the height adjusting mechanism and the falloff preventing mechanism.

It is difficult to perform unlocking operation by one person if the height adjusting mechanism and the falloff preventing mechanism have to be simultaneously operated. However, in the present invention, the falloff preventing notch for the height adjusting mechanism and the falloff preventing notch for the falloff preventing mechanism are provided in the different height positions, so the unlocking operation can be performed separately (at different times). As a result, a headrest drawing out operation can be performed by only one person.

The automobile headrest of the present invention is characterized in that the height adjusting mechanism and the headrest falloff preventing mechanism can be composed of identical components.

With this construction, the automobile headrest of the present invention can be provided at low cost.

According to the automobile headrest of the present invention, the following effects can be obtained.

(1) One of the headrest bushes in which one of the headrest stays is inserted is provided with the height adjusting mechanism that also serves as the headrest falloff preventing mechanism, and another of the headrest bushes is provided with the headrest falloff preventing mechanism. Therefore, to draw the headrest out, it is required to perform the unlocking operation for both the height adjusting mechanism and the falloff preventing mechanism. Accordingly, the headrest is prevented from being drawn out from the seat back inadvertently or on purpose. Therefore, the headrest is always secured in position thereby ensuring passenger safety.

(2) When it is required to draw the headrest out from the seat for the purposes of cleaning, maintenance, and the like, the headrest can be drawn out through the unlocking operation performed for the height adjusting mechanism and the falloff preventing mechanism.

(3) It is difficult to perform unlocking operation when one person draws out the headrest if the height adjusting mechanism and the falloff preventing mechanism have to be simultaneously operated. However, in the present invention, the falloff preventing notch for the height adjusting mechanism and the falloff preventing notch for the falloff preventing mechanism are provided at the different height positions, so the unlocking operation can be performed separately (at different times). As a result, a headrest drawing out operation can be performed by only one person.

(4) The falloff preventing mechanism can be composed of the same components of the height adjusting mechanism, so they are not required to be separately manufactured, thereby making it possible to provide the headrest at low cost.

DETAILED DESCRIPTION OF THE PREFERRED EMBODIMENTS

Figure 1:
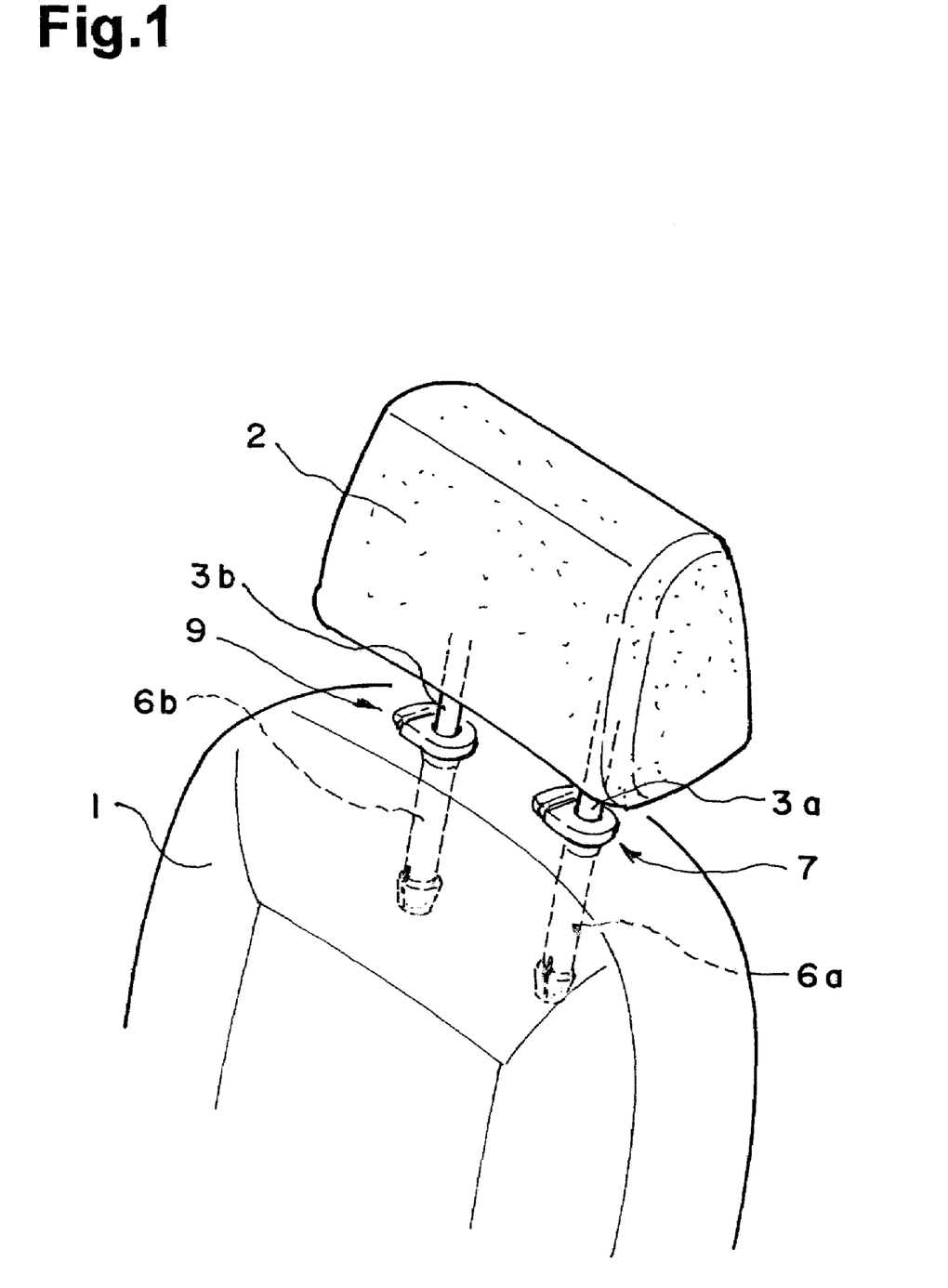
FIG. 1 is a perspective view according to an embodiment of the present invention.
Figure 2:
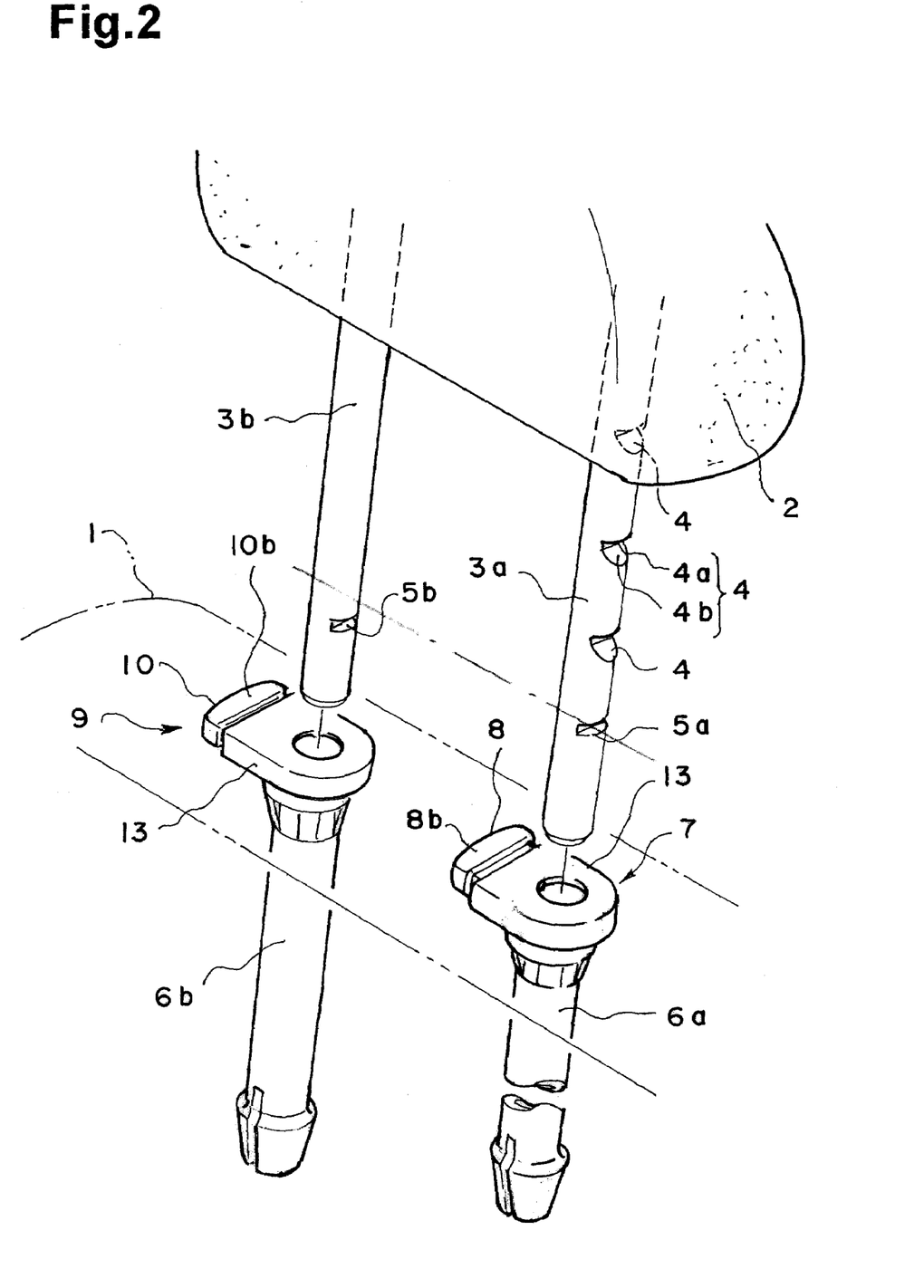
FIG. 2 is an exploded perspective view of a main part according to the embodiment of the present invention.
Figure 3:
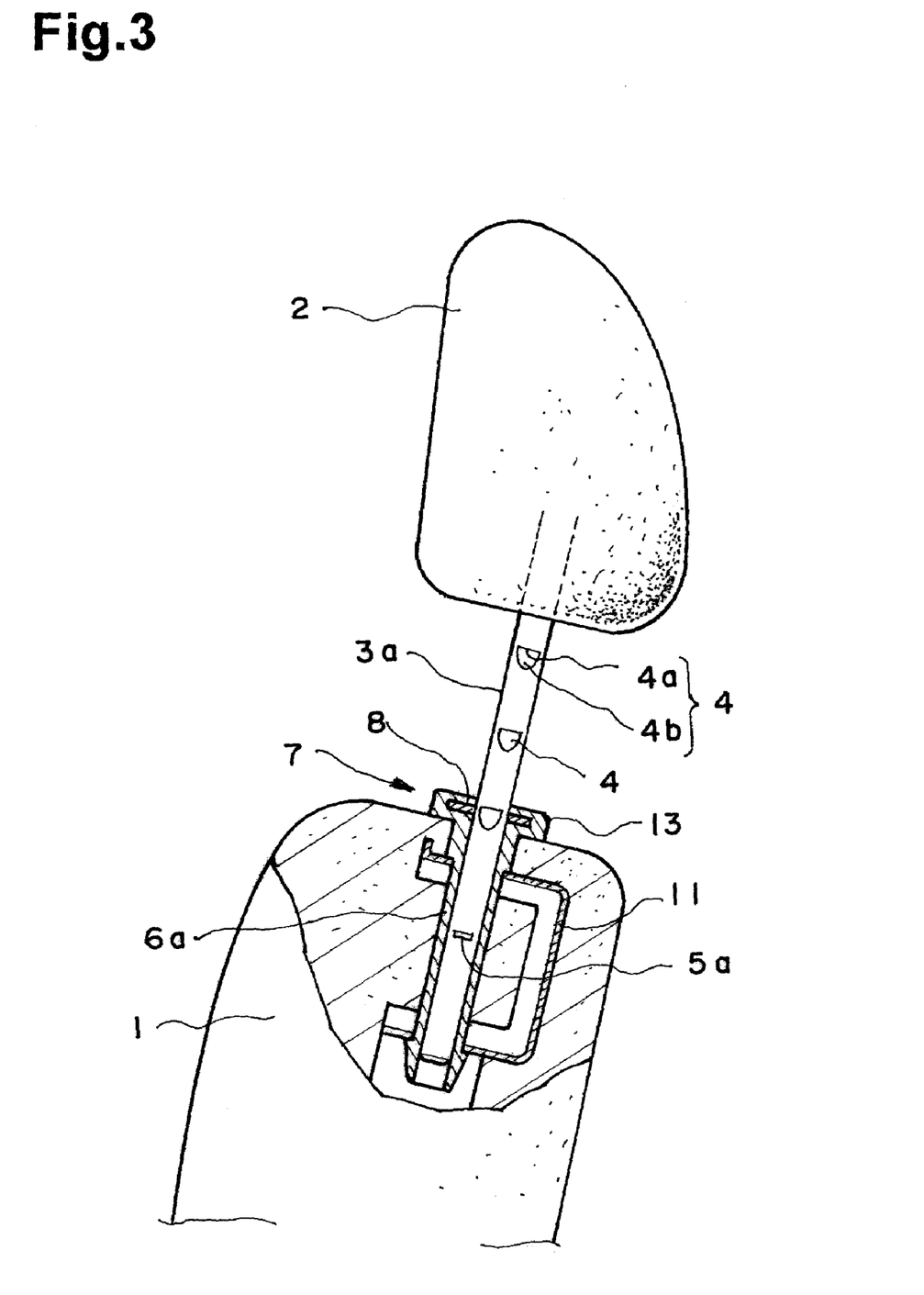
FIG. 3 is a partially broken side view according to the embodiment of the present invention.
Figure 4:
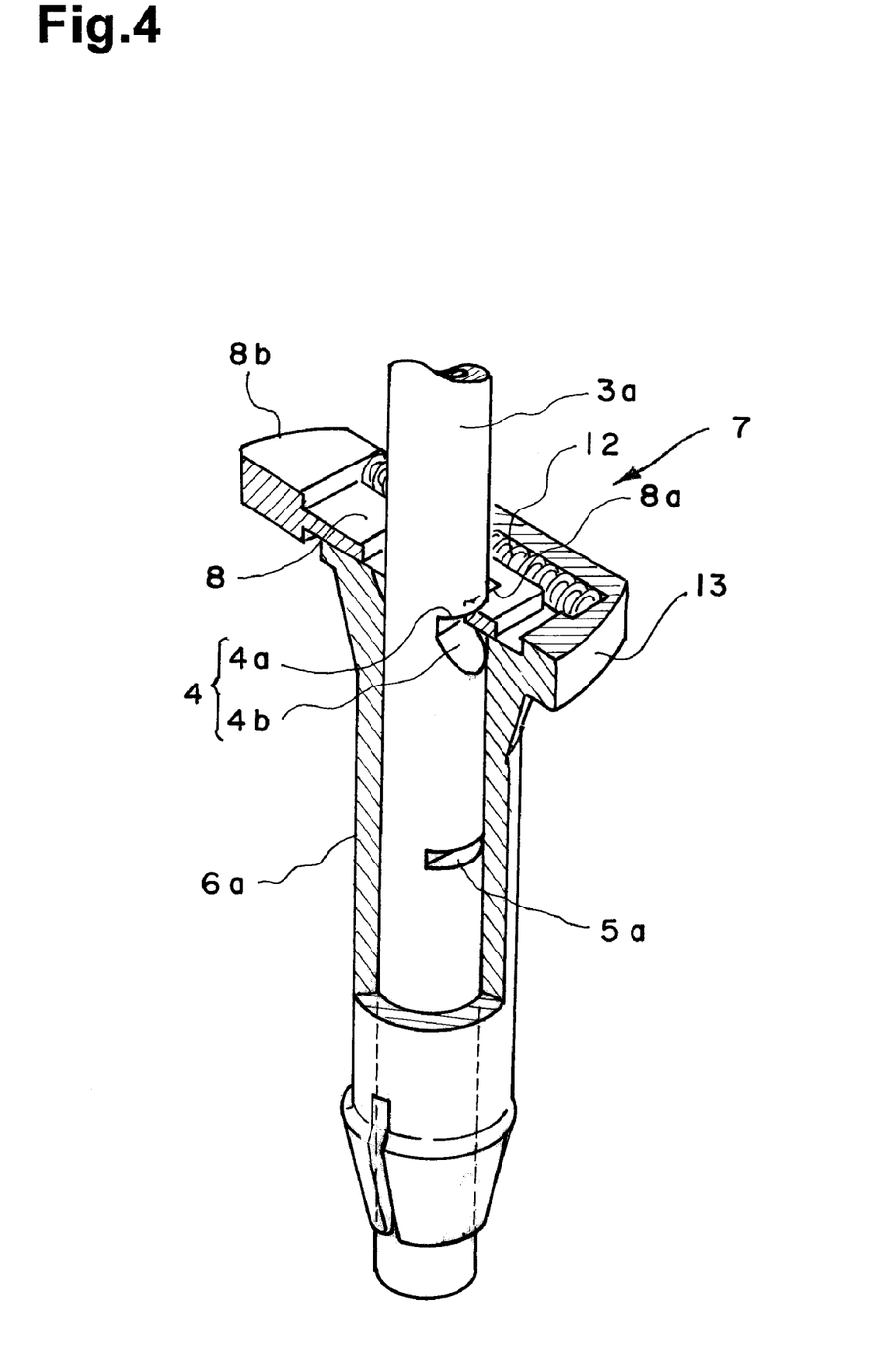
FIG. 4 is a sectional perspective view of a main part of a height adjusting mechanism of a headrest, which also serves as a falloff preventing mechanism.
Figure 5:
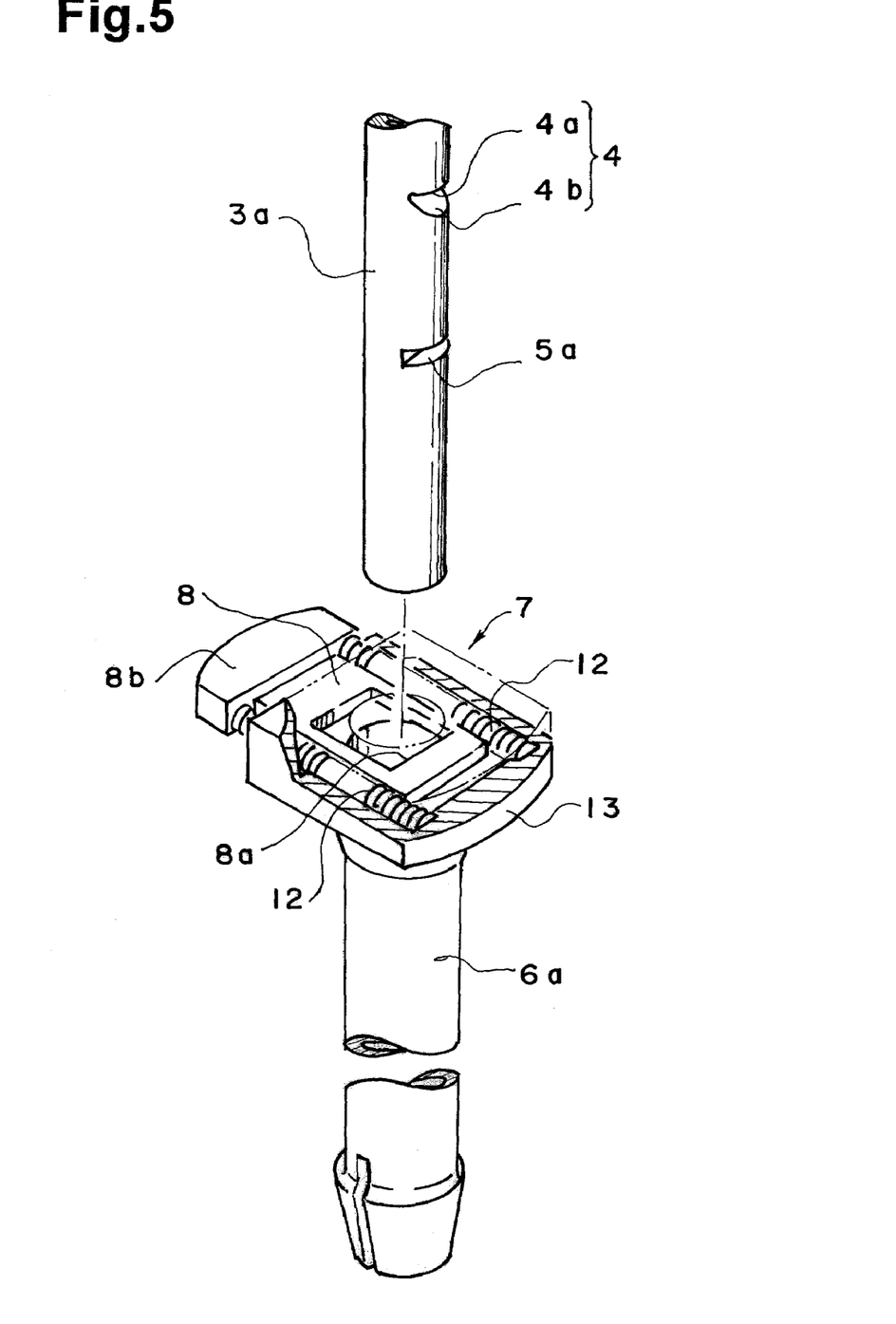
FIG. 5 is an exploded perspective view of the main part of the height adjusting mechanism of a headrest, which also serves as the falloff preventing mechanism.
Figure 6:
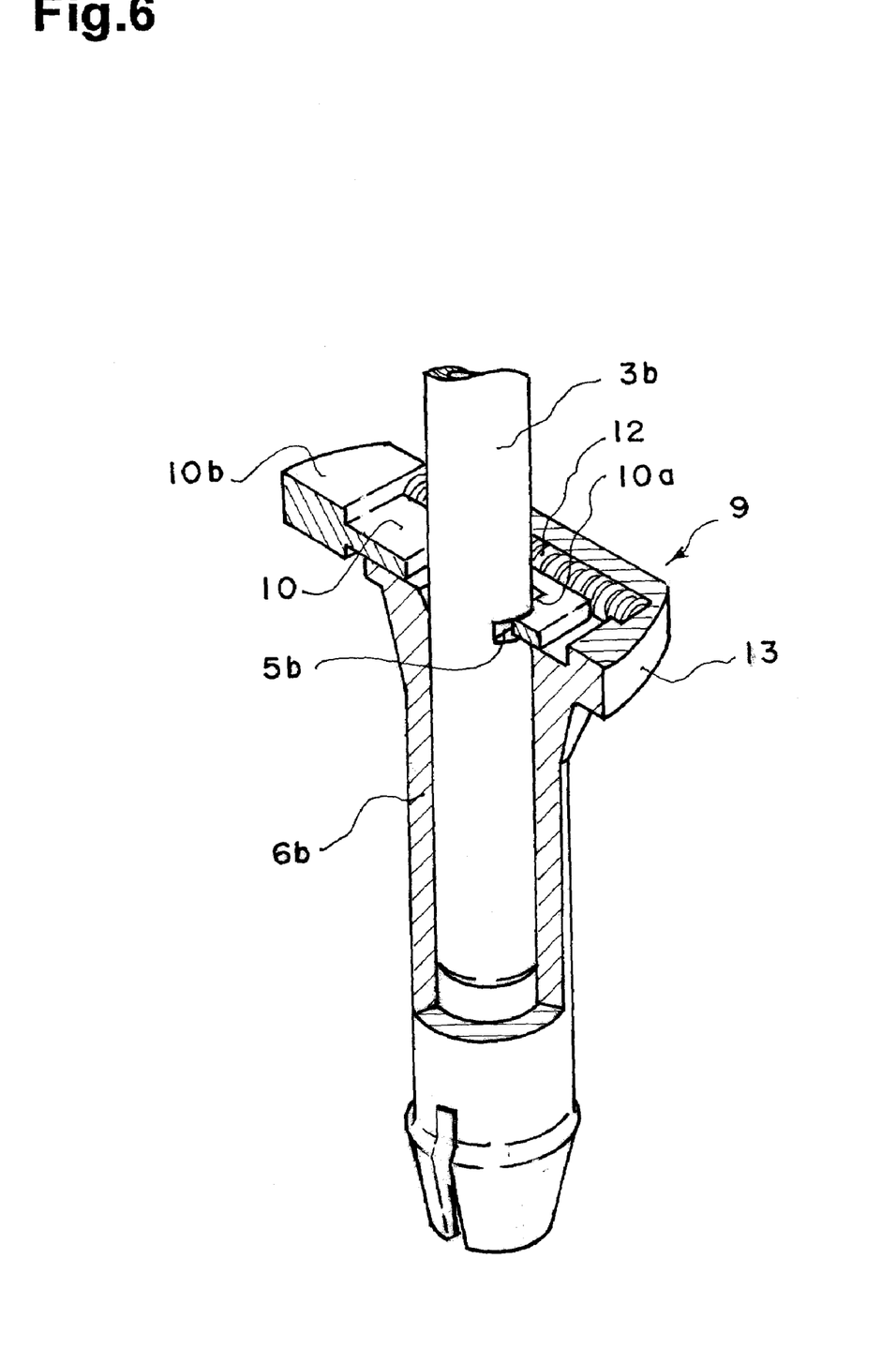
FIG. 6 is a sectional perspective view of a main part of the falloff preventing mechanism.

In the following, to describe the present invention in more detail, the description is made for an embodiment with reference to the drawings. FIG. 1 is a perspective view of an embodiment of the present invention. FIG. 2 is an exploded perspective view of a main part of the embodiment of the present invention. FIG. 3 is a partially broken side view of the embodiment of the present invention. FIG. 4 is a sectional perspective view of a main part of a height adjusting mechanism of a headrest, which also serves as a falloff preventing mechanism. FIG. 5 is an exploded perspective view of the main part of the height adjusting mechanism of a headrest, which also serves as the falloff preventing mechanism. FIG. 6 is a sectional perspective view of a main part of the falloff preventing mechanism, and shows a state in which the present invention is applied to a front seat of an automobile. Note that, the same components as those of FIGS. 7 and 8 are denoted by the same reference symbols.

A headrest 2 includes: headrest stays 3a and 3b for supporting the headrest 2; headrest bushes 6a and 6b, which are fixedly mounted in a seat back 1 and in which the headrest stay 3a and the headrest stay 3b are inserted and supported, respectively; a height adjusting mechanism 7 provided to the headrest bush 6a in which the headrest stay 3a is vertically adjustably inserted and supported; and a headrest falloff preventing mechanism 9 provided to the headrest bush 6b in which the headrest stay 3b is inserted.

The headrest stay 3a is provided with a height adjusting notch 4 and a falloff preventing notch 5a. The height adjusting mechanism 7 can also serve as one headrest falloff preventing mechanism, so the height adjusting mechanism 7 can lock and unlock the headrest 2.

The headrest stay 3b is provided with a falloff preventing notch 5b. The headrest falloff preventing mechanism 9 is provided with a lock member 8 which abuts on the headrest stay 3b inserted in the headrest bush 6b due to a resilient force of a spring 12 so as to be capable of reciprocating. The lock member 8 engages with the falloff preventing notch 5b of the headrest stay 3b to prevent the headrest 2 from falling off, and disengages from the falloff preventing notch 5b through an operation performed for the lock member against the resilient force of the spring 12. The falloff preventing notches 5a and 5b arranged in both headrest stays 3a and 3b, respectively, are provided at different height positions.

The headrest 2 is supported by the headrest stays 3a and 3b which are inserted into the tubular headrest bushes 6a and 6b, respectively. The headrest stays 3a and 3b are attached to the headrest 2 to support the headrest 2. The headrest bushes 6a and 6b are securely installed on the side of a seat back 1. The two headrest stays 3a and 3b are laterally arranged. As shown in FIG. 3, the headrest bushes 6a and 6b are fixed to a seat back frame 11 of the seat back 1. While the headrest bush 6a is provided with the height adjusting mechanism 7 which also serves as the falloff preventing mechanism, the headrest bush 6b is provided with the falloff preventing mechanism 9. With the height adjusting mechanism 7, the headrest stay 3a can be stopped at an arbitrary height and can be prevented from falling off. With the falloff preventing mechanism 9, the headrest stay 3b can be prevented from falling off.

A structure of the height adjusting mechanism 7 is substantially identical with that shown in FIGS. 6 and 7. The height adjusting mechanism 7 is characterized in that the headrest stay 3a is provided with the height adjusting notches 4 and the falloff preventing notch 5a. In the height adjusting mechanism 7, as shown in FIG. 4, a lock plate 8 as a lock member is so attached to the headrest bush 6a as to be free to reciprocate perpendicularly to the headrest stay 3a which penetrates the lock plate 8 to be inserted into the headrest bush 6a. In a region where the headrest stay 3a penetrates the lock plate 8, a gap formed between the headrest stay 3a and the lock plate 8 allows the lock plate 8 to move (reciprocate). A portion 8a of the lock plate 8 is pressed against the penetrating headrest stay 3a due to a resilient force of a spring 12. The lock plate 8 and the spring 12 are accommodated in a case 13, and only an operating portion 8b of the lock plate 8 protrudes outside. An unlocking operation can be performed by pressing the operating portion 8b. The headrest stay 3a has a plurality of height adjusting notches 4 that are arranged at intervals of a predetermined distance. The falloff preventing notch 5a is provided at a lowermost portion of the headrest stay 3a. Each of the height adjusting notches 4 is formed of a horizontal face 4a extending toward the center of the headrest stay 3a and an inclined face 4b extending downwards from the deepest portion of the horizontal face 4a. The inclined face 4b is gradually increased in diameter with distance from the deepest portion of the horizontal face 4a. The falloff preventing notch 5a is formed of a groove having a rectangular cross section provided in an outside surface of the headrest stay 3a.

Accordingly, when the headrest 2 is pulled upwards (pulled outwards), the portion 8a at which the lock plate 8 abuts on the headrest stay 3a is released from the height adjusting notch 4 against a resilient force (spring force) of the spring 12 by the action of an operation of the inclined face 4b of the notch 4. As a result, the headrest stay 3a can be moved upwards and the height of the headrest 2 can be adjusted. In moving downwards, the headrest 2 stops at a corresponding position where the horizontal face 4a of the notch 4 is locked by being engaged with the lock plate 8. In contrast, when the headrest 2 is pressed downwards, the lock plate 8 remains engaged with the horizontal face 4a of the notch 4 without being released from the notch 4. To move the headrest stay 3a downwards, the operating portion 8b of the lock plate 8 is pressed to unlock the headrest stay 3a. As a result, the headrest 2 can be adjusted toward a lower position. Further, according to the present invention, the headrest stay 3a is provided with the falloff preventing notch 5a, so when the headrest stay 3b is moved upwards and the 5a reaches a position of the lock plate 8, the lock plate 8 is locked by being engaged with the groove of the notch 5a. As a result, the headrest stay 3a is prevented from being moved upwards. Therefore, the headrest stay 3a cannot be moved any further upwards which prevents the headrest 2 from falling off. To move the headrest stay 3a further upwards for removal, the operating portion 8b of the lock plate 8 is pressed to unlock the headrest stay 3a.

The falloff preventing mechanism 9 is substantially identical with the aforementioned height adjusting mechanism 7 in terms of construction. However, the falloff preventing mechanism 9 is different from the height adjusting mechanism 7 in that the falloff preventing mechanism 9 is provided with only a falloff preventing notch 5a formed in a lower portion of the inserted headrest stay 3b. In other words, as shown in FIG. 6, a lock plate 10 as a lock member is so attached to the headrest bush 6b as to be free to reciprocate perpendicularly to the headrest stay 3b which penetrates the lock plate 10 to be inserted into the headrest bush 6b. In a region where the headrest stay 3b penetrates the lock plate 10, a gap formed between the headrest stay 3b and the lock plate 10 allows the lock plate 10 to move (reciprocate). A portion 10a at which the lock plate 10 is pressed against the penetrating headrest stay 3b due to a resilient force of the spring 12. The lock plate 10 and the spring 12 are accommodated in the case 13, and only an operating portion 10b of the lock plate 10 protrudes outside. An unlocking operation can be performed by pressing the operating portion 10b. The falloff preventing notch 5b is formed in the lower portion of the headrest stay 3b. The falloff preventing notch 5b is formed of a groove having a rectangular cross section provided in an outside surface of the headrest stay 3b. As shown in FIG. 2, the falloff preventing notch 5b is provided at a different height position from the falloff preventing notch 5a provided in the headrest stay 3a.

Accordingly, the headrest stay 3b is free to move vertically. However, when the headrest stay 3b is moved upwards and the falloff preventing notch 5b reaches a position corresponding to the lock plate 10, the lock plate 10 is locked by being engaged with the groove of the notch 5b as shown in FIG. 6. As a result, the headrest stay 3b is prevented from being moved upwards. Therefore, the headrest stay 3b cannot move any further upwards, which prevents the headrest 2 from falling off. To move the headrest stay 3b further upwards for removal, the operating portion 10b of the lock plate 10 is pressed to unlock the headrest stay 3b. The unlocking operation can be performed separately for the headrest stay 3a and for the headrest stay 3b because the falloff preventing notch 5a provided in the headrest stay 3a and the falloff preventing notch 5b provided in the headrest stay 3b are arranged at different height positions while the height adjusting mechanism 7 and the falloff preventing mechanism 9 are provided at the same height positions. As a result, the headrest can be drawn out by one person.

Here, in the regions where the headrest stays 3a and 3b penetrate the lock plates 8 and 10, respectively, the gaps are formed between the headrest stay 3a and the lock plate 8 and between the headrest stay 3b and the lock plate 10, respectively, to allow the lock plates 8 and 10 to move (reciprocate). The gaps are formed with the intention of allowing the lock plates 8 and 10 to be pressed and moved so as to be disengaged (unlocked) from the notches 4, and 5a and 5b, respectively. Therefore, the gaps are set to widths required for releasing the lock plates 8 and 10 from the notches 4, and 5a and 5b, respectively.

As described above, with the height adjusting mechanism 7 according to the present invention, the height of the headrest 2 can be adjusted by moving the headrest 2 upwards and can be pushed downwards through the unlocking operation for the lock plate 8 performed by pressing the operating portion 8b. Further, even if the headrest 2 is moved upwards, the lock plate 8 is engaged with the falloff preventing notch 5a to be locked, which prevents the headrest 2 from being pulled any further upwards and falling off. To pull the headrest 2 further upwards for removal, the operating portion 8b of the lock plate 8 is pressed to unlock the headrest stay 3a. As described above, the height adjusting mechanism also serves as the falloff preventing mechanism.

In the falloff preventing mechanism 9, even when the headrest 2 is moved upwards, the falloff preventing notch 5b of the headrest stay 3b reaches the lock plate 10 to be engaged with the lock plate 10, which locks the headrest stay 3b so as not to be moved further upwards. Thus, the headrest 2 cannot be pulled any further upwards and is prevented from falling off. To pull the headrest 2 upwards to draw out, the operating portion 10b of the lock plate 10 is pressed to unlock the headrest stay 3b. In the present invention, therefore, to draw the headrest 2 out from the seat back 1, it is required to operate both the operating portions 8b and 10b of the height adjusting mechanism 7 and the falloff preventing device 9, respectively. The operation can be performed individually for the headrest stay 3a and for the headrest stay 3b because the falloff preventing notch 5a provided in the headrest stay 3a and the falloff preventing notch 5b provided in the headrest stay 3b are arranged at different height positions while the height adjusting mechanism 7 and the falloff preventing mechanism 9 are provided at the same height positions. As a result, the headrest can be drawn out by one person.

With this construction, the height of the headrest 2 can be adjusted and the headrest 2 can be prevented from falling off. Further, the falloff preventing notches are provided to both the height adjusting mechanism 7 and the falloff preventing mechanism 9 which makes it difficult to pull the headrest stays upwards inadvertently or on purpose, so the headrest 2 can be prevented from being drawn out from the seat back 1. However, when it is necessary to draw the headrest 2 out from the seat back 1, for example, for such purpose as cleaning or maintenance, the headrest 2 can be drawn out by through the unlocking operation. The height adjusting mechanism 7 can also serve as one headrest falloff preventing mechanism. Further, by merely changing a shape of the notch 5b provided in the headrest stay 3b, the falloff preventing mechanism 9 can be constructed of the same components as those of the height adjusting mechanism.

The aforementioned embodiments are not intended to limit the present invention and can be subjected to various modifications insofar as they do not depart from the gist of the present invention. For example, the height adjusting mechanism, and the lock mechanism and the unlock mechanism of the falloff preventing mechanism may adopt a conventional known means. Further, shapes of the falloff preventing notches 5a and 5b can be subjected to various modifications.

The present invention is applicable not only to automobiles but also to other vehicles.

What is claimed is:

1. An automobile headrest, comprising:
    at least two headrest stays for supporting the headrest;
    at least two headrest bushes fixed and provided on a seat back side, the at least two headrest stays being inserted in the at least two headrest bushes, respectively, to be supported; and
    a height adjusting mechanism connected to one of the at least two headrest bushes, wherein:
    one of the at least two headrest stays inserted in one of the at least two headrest bushes provided with the height adjusting mechanism includes a falloff preventing notch in addition to height adjusting notches;
    the height adjusting mechanism also serves as one headrest falloff preventing mechanism so that locking and unlocking of the headrest is performed by the height adjusting mechanism;
    another of the at least two headrest stays includes another falloff preventing notch;
    another of the at least two of headrest bushes in which another of the at least two headrest stays is inserted, includes the headrest falloff preventing mechanism, which is disengaged with the falloff preventing notch by the operation of the headrest falloff preventing mechanism; and
    the falloff preventing notches provided in both the at least two headrest stays are arranged at different height positions from one another so that unlocking operations of the height adjusting mechanism and the falloff preventing mechanism when the headrest is drawn out, must be performed separately.

2. An automobile headrest according to claim 1,
    wherein one of the at least two headrest stays is vertically adjustably inserted into one of the at least two headrest bushes provided with the height adjusting mechanism, said height adjusting mechanism supporting one of the at least two headrest stays,
    said headrest falloff preventing mechanism having a lock member, said lock member being reciprocatingly movable and contacting another of the at least two headrest stays inserted in another of the at least two of the headrest bushes due to a resilient force of a spring, said lock member engaging the falloff preventing notch of another of the at least two headrest stays to prevent the headrest from falling off, and disengaging from the falloff preventing notch through an operation performed for the lock member against the resilient force of the spring.

3. An automobile headrest according to claim 2, wherein the height adjusting mechanism and the headrest falloff preventing mechanism can be constructed of identical components.

4. An automobile headrest according to claim 1, wherein the height adjusting mechanism and the headrest falloff preventing mechanism can be constructed of identical components.

5. An automobile headrest, comprising:

two headrest stays for supporting the headrest;

two headrest bushes fixed and provided on a seat back side, two headrest stays being inserted and supported in the two headrest bushes, respectively; and a height adjusting mechanism connected to one of the at least two headrest bushes, wherein:

at least one of the two headrest stays is vertically adjustably inserted into at least one of the two headrest bushes provided with the height adjusting mechanism and includes a falloff preventing notch in addition to height adjusting notches, said height adjusting mechanism supporting at least one of the two headrest stays;

the height adjusting mechanism functions as at least one headrest falloff preventing mechanism such that the height adjustment mechanism locks and unlocks the headrest;

another of the two headrest stays includes another falloff preventing notch;

another of the two headrest bushes in which another of the two headrest stays is inserted, includes the headrest falloff preventing mechanism, said headrest falloff preventing mechanism having a lock member, said lock member being reciprocatingly movable and contacting another of the two headrest stays inserted in another of the two of the headrest bushes due to a resilient force of a spring, said lock member engaging the falloff preventing notch to prevent the headrest from falling off and disengaging the falloff preventing notch to release the another of the two headrest stays; and the falloff preventing notches provided in both the two headrest stays are arranged at different height positions from one another such that unlocking operations of the height adjusting mechanism and the falloff preventing mechanism when the headrest is drawn out, must be performed separately.

6. An automobile headrest, comprising:

two headrest stays for supporting the headrest;

two headrest bushes fixed and provided on a seat back side, the two headrest stays being inserted in the two headrest bushes, respectively, to be supported; and a height adjusting mechanism connected to one of the two headrest bushes, wherein:

one of the two headrest stays inserted into one of the two headrest bushes provided with the height adjusting mechanism includes a falloff preventing notch in addition to height adjusting notches;

the height adjusting mechanism also serves as one headrest falloff preventing mechanism such that the height adjusting mechanism locks and unlocks the headrest, said height adjusting mechanism and said headrest preventing mechanism being constructed of identical components;

another of the two headrest stays includes another falloff preventing notch;

another of the two headrest bushes in which another of the two headrest stays is inserted, includes the headrest falloff preventing mechanism, said headrest falloff preventing mechanism disengaging the falloff preventing notch to release the another of the two headrest stays; and the falloff preventing notches provided in both the two headrest stays are arranged at different height positions from one another so that unlocking operations of the height adjusting mechanism and the falloff preventing mechanism when the headrest is drawn out, must be performed separately.

7. An automobile headrest, comprising:

headrest stays for supporting the headrest;

headrest bushes fixed and provided on a seat back side, said headrest stays being inserted and supported in the headrest bushes, respectively; and a height adjusting mechanism connected to at least one of the headrest bushes, wherein:

at least one of the headrest stays is vertically adjustably inserted into at least one of the headrest bushes provided with the height adjusting mechanism, said at least one headrest stray including a falloff preventing notch in addition to height adjusting notches, said height adjusting mechanism supporting at least one of the headrest stays;

the height adjusting mechanism functions as at least one headrest falloff preventing mechanism such that the height adjustment mechanism locks and unlocks the headrest, said height adjusting mechanism and said headrest falloff preventing mechanism being composed of identical components;

another headrest stay includes another falloff preventing notch; another headrest bush in which the another headrest stay is inserted, includes the headrest falloff preventing mechanism, said headrest falloff preventing mechanism having a lock member, said lock member being reciprocatingly movable and contacting the another headrest stay inserted in the another headrest bush due to a resilient force of a spring, said lock member engaging the falloff preventing notch to prevent the headrest from falling off and disengaging the falloff preventing notch to release the another headrest stay; and the falloff preventing notches provided in the headrest stays are arranged at different height positions from one another such that unlocking operations of the height adjusting mechanism and the falloff preventing mechanism when the headrest is drawn out, must be performed separately.

* * * * *